US008689657B2

(12) United States Patent
Adler et al.

(10) Patent No.: US 8,689,657 B2
(45) Date of Patent: Apr. 8, 2014

(54) AXIALLY COMPACT SUPPORT FOR A GEAR WITHIN A GEARBOX

(75) Inventors: Jonathan M Adler, Ann Arbor, MI (US); Dennis Cook, Royal Oak, MI (US)

(73) Assignee: McLaren Performance Technologies, Inc., Southfield, MI (US)

( * ) Notice: Subject to any disclaimer, the term of this patent is extended or adjusted under 35 U.S.C. 154(b) by 351 days.

(21) Appl. No.: 13/003,385

(22) PCT Filed: Jul. 9, 2009

(86) PCT No.: PCT/US2009/004018
§ 371 (c)(1),
(2), (4) Date: Jan. 10, 2011

(87) PCT Pub. No.: WO2010/005583
PCT Pub. Date: Jan. 14, 2010

(65) Prior Publication Data
US 2011/0162472 A1 Jul. 7, 2011

Related U.S. Application Data

(60) Provisional application No. 61/134,315, filed on Jul. 9, 2008.

(51) Int. Cl.
*F16H 57/02* (2012.01)
(52) U.S. Cl.
USPC .............................................. 74/417; 74/640
(58) Field of Classification Search
USPC .............................. 74/409, 416, 417, 423, 424
See application file for complete search history.

(56) References Cited

U.S. PATENT DOCUMENTS

| 1,143,720 | A |   | 6/1915  | Masury |
| 1,893,572 | A |   | 1/1933  | Wildhaber |
| 2,105,437 | A |   | 1/1938  | Hansen |
| 2,181,425 | A | * | 11/1939 | Delaval-Crow et al. ......... 74/417 |
| 2,352,086 | A | * | 6/1944  | Eberhard ...................... 180/9.62 |
| 2,486,799 | A | * | 11/1949 | Oppenheim ..................... 74/355 |
| 2,520,887 | A | * | 8/1950  | Miller, Jr. ..................... 475/332 |
| 2,891,369 | A | * | 6/1959  | Rietz .............................. 56/13.8 |
| 2,951,395 | A | * | 9/1960  | Smith et al. ................. 74/606 R |
| 3,385,043 | A | * | 5/1968  | Seymore ......................... 56/503 |
| 3,503,274 | A | * | 3/1970  | Howard .......................... 74/325 |
| 3,589,204 | A | * | 6/1971  | Langley ......................... 440/59 |

(Continued)

FOREIGN PATENT DOCUMENTS

DE    2100207     7/1971
DE    3626822     3/1987

(Continued)

*Primary Examiner* — Troy Chambers
*Assistant Examiner* — Valentin Craciun
(74) *Attorney, Agent, or Firm* — Miller Canfield

(57) ABSTRACT

A gearbox transmits rotational movement from a driving member to a driven member. The gearbox includes a pinion gear disposed inside a housing. The gear defines an axial bore and rotates in response to rotation of the driving member. An output member extends through the axial bore and engages therewith such that the output member rotates in response to rotation of the gear. The output member extends to a position outside the housing to rotate the driven member. A clamping nut is threadably coupled to the output member and abuts the gear thereby retaining the output member and the gear together. A bearing is disposed radially between the gear and the housing. The bearing rotatably supports the gear and the output member.

14 Claims, 7 Drawing Sheets

(56) References Cited

U.S. PATENT DOCUMENTS

| | | | |
|---|---|---|---|
| 3,942,387 A * | 3/1976 | Stone et al. .................... 74/417 |
| 3,943,790 A * | 3/1976 | Meyer ............................. 74/417 |
| 4,437,355 A | 3/1984 | Bordat |
| 4,798,548 A * | 1/1989 | Higby et al. .................... 440/78 |
| 4,838,108 A * | 6/1989 | Flanhardt et al. ............... 74/417 |
| 4,867,001 A | 9/1989 | Sasaki et al. |
| 4,930,367 A | 6/1990 | Nagasawa |
| 5,342,228 A * | 8/1994 | Magee et al. ................... 440/76 |
| 5,450,714 A * | 9/1995 | Lurwig .......................... 56/13.5 |
| 5,626,007 A * | 5/1997 | Harrington et al. ............ 56/13.5 |
| 5,690,183 A * | 11/1997 | Sollami ........................ 173/216 |
| 5,743,145 A | 4/1998 | Terada et al. |
| 6,293,704 B1 * | 9/2001 | Gradu ........................... 384/557 |
| 6,769,185 B2 | 8/2004 | Kottke et al. |
| 7,178,424 B2 | 2/2007 | Petruska et al. |
| 8,074,532 B2 * | 12/2011 | Zirkl .............................. 74/417 |
| 2002/0134605 A1 | 9/2002 | Bowen et al. |
| 2003/0083171 A1 * | 5/2003 | Turner et al. .................. 475/230 |
| 2004/0259676 A1 * | 12/2004 | Turner et al. .................. 475/246 |
| 2006/0219037 A1 | 10/2006 | Inose et al. |

FOREIGN PATENT DOCUMENTS

| | | |
|---|---|---|
| DE | 19718744 | 11/1998 |
| DE | 19826067 | 12/1999 |
| DE | 19928376 | 1/2001 |
| DE | 102004038518 | 3/2006 |
| EP | 1591694 | 11/2005 |

\* cited by examiner

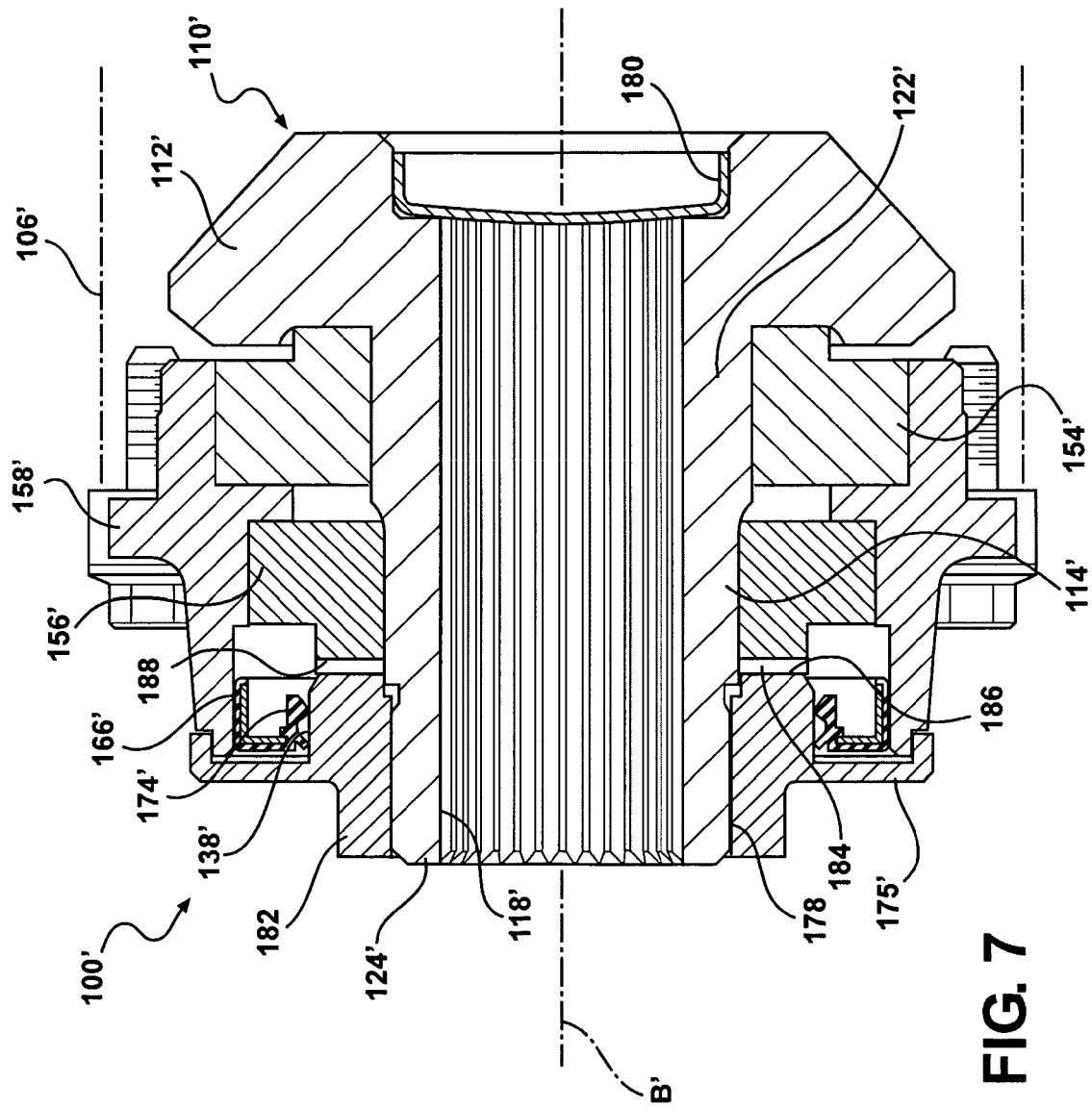

AXIALLY COMPACT SUPPORT FOR A GEAR WITHIN A GEARBOX

CROSS-REFERENCE TO RELATED APPLICATION

This application claims priority to and all the benefits of U.S. Provisional Application No. 61/134,315, filed on Jul. 9, 2008 and entitled "Axially Compact Support For A Gear."

BACKGROUND OF THE INVENTION

1. Field of the Invention

The invention relates to an axially compact design of a gearbox.

2. Description of Related Art

Typically, gearboxes are used to increase torque while reducing the speed of a prime mover output shaft (e.g. a motor drive shaft). This means that the output shaft of a gearbox will rotate at a slower rate than an input shaft. This reduction in speed will produce a mechanical advantage, causing an increase in torque. Alternatively, gearboxes can be setup to do the opposite and provide an increase in shaft speed with a reduction of torque. Some of the simplest gearboxes merely change the physical direction in which power is transmitted.

Due to the shrinking size of automotive vehicles and increasing fuel economy standards, size and weight of major vehicle components is of critical importance. Gearboxes used in a vehicle driveline are usually large and bulky. Thus, reducing the size and weight of such gearboxes is highly desirable.

Conventional gearbox designs include a housing for containing a gear having a gear portion and an axially extending gear stem. The gear is supported by a pair of spaced apart bearings disposed radially between the gear stem and the housing. The gear stem includes an end portion spaced apart from the gear portion that is externally splined for engagement with an output member having an output flange and an axially extending output stem that is internally splined. The gear stem extends through the output stem and a clamping nut is threaded to the end portion of the gear stem to retain the output member and gear together. Thus, in conventional gearbox designs, the axial length of the gearbox housing is generally determined by the axial length of the gear and output member.

In order to reduce the axial length of the gearbox housing, the axially extending gear stem may be shortened and splined along its length. The axially extending output stem, which is internally splined, overlaps and engages with the externally splined gear stem. The spaced apart bearings are thus disposed radially between the output stem and the housing.

There are certain disadvantages with known gearbox designs. First, the clamping nut positioned outside of the housing adds to the axial length of the gearbox. Second, two separate leak paths for gearbox lubricant exist at the end of the housing adjacent the output flange. A first leak path exists between the output flange and the housing. A second leak path exists at the interface between the clamping nut, the gear stem and the output flange. Third, the thrust face of the clamping nut is seated against the output flange, which is not a hardened material or must be hardened for this purpose. Fourth, the clamping nut is sometimes required to be staked to the gear stem to keep the clamping nut from coming loose. Staking the clamping nut to the hardened gear steel of the gear stem may result in a less than robust joint. If disassembly of the clamping nut and gear stem is required and the gear is to be re-used, there is potential for residual damage to the gear stem from the previous staking operation. In addition, shock load from the staking operation is transmitted through the brittle gear steel. Fifth, after carburizing the gear, the end of the gear stem that is threaded to receive the clamping nut becomes brittle and must be annealed to prevent fracture.

It is desirable, therefore, to provide an improved, axially compact gearbox that reduces the number of leak paths for gearbox lubricant. It is also desirable to provide an axially compact gearbox that is more robust, while being cheaper and easier to manufacture.

SUMMARY OF THE INVENTION

According to one aspect of the invention, a gearbox is provided for transmitting rotational movement from a driving member to a driven member. The gearbox includes a housing and a pinion gear disposed inside the housing. The pinion gear is adapted for engagement with the driving member and the pinion gear defines an axial bore that extends therethrough. The pinion gear rotates in response to rotation of the driving member. The gearbox also includes an output member that extends through the axial bore of the pinion gear and engages therewith such that the output member rotates in response to rotation of the pinion gear. The output member extends to a position outside the housing whereat the output member is adapted for engagement with the driven member. A clamping nut is threadably coupled to the output member and abuts the pinion gear to retain the output member and the pinion gear together. A bearing is disposed radially between the pinion gear and the housing and rotatably supports the pinion gear and the output member.

According to another aspect of the invention, a gearbox includes a housing defining an internal cavity. An input shaft is disposed in the internal cavity and extends along a first axis. The input shaft includes a ring gear rotatable with the input shaft about the first axis. A pinion gear is disposed in the internal cavity and extends along a second axis generally perpendicular to the first axis. The pinion gear includes a gear portion meshingly engaged with the ring gear and a tubular gear stem that extends axially from the gear portion along the second axis. The pinion gear rotates about the second axis in response to rotation of the input shaft about the first axis. An output member includes an output flange disposed outside the housing and an output stem extending axially from the output flange along the second axis through the tubular gear stem. The output stem engages with the tubular gear stem thereby rotating the output member about the second axis in response to rotation of the pinion gar about the second axis. A clamping nut is threadably coupled to the output stem and abuts the gear portion of the pinion gear to retain the output member and the pinion gear together. First and second bearings are disposed radially between the tubular gear stem and the housing rotatably supporting the pinion gear and the output member.

According to yet another aspect of the invention, a gearbox is provided for transmitting rotational movement from a driving member to a driven member. The gearbox includes a housing. A pinion gear includes a gear portion and a tubular gear stem that extends from the gear portion to a threaded distal end. The tubular gear stem defines first and second circumferential surfaces and an axial bore that has an internally splined surface. The pinion gear rotates in response to rotation of the driving member. A bearing support is fixedly secured to the housing. The bearing support defines first and second circumferential bearing surfaces. First and second bearings are disposed radially between the first and second circumferential bearing surfaces of the bearing support and the first and second circumferential surfaces of the tubular gear stem. A clamping nut is threadably coupled to the threaded distal end of the tubular gear stem and preloads the first bearing between the gear portion of the pinion gear and the bearing support. The clamping nut preloads the second bearing between the clamping nut and the bearing support. An output member extends through the axial bore of the tubular gear stem and engages therewith. The output member extends to a position outside the housing whereat the output member is adapted for engagement with the driven member. The output member rotates in response to rotation of the pinion gear.

BRIEF DESCRIPTION OF THE DRAWINGS

Advantages of the present invention will be readily appreciated as the same becomes better understood by reference to the following detailed description when considered in connection with the accompanying drawings wherein:

FIG. 7 is a cross-sectional view of a gearbox according to a second embodiment of the invention.

DETAILED DESCRIPTION OF THE EMBODIMENTS

Figure 1:
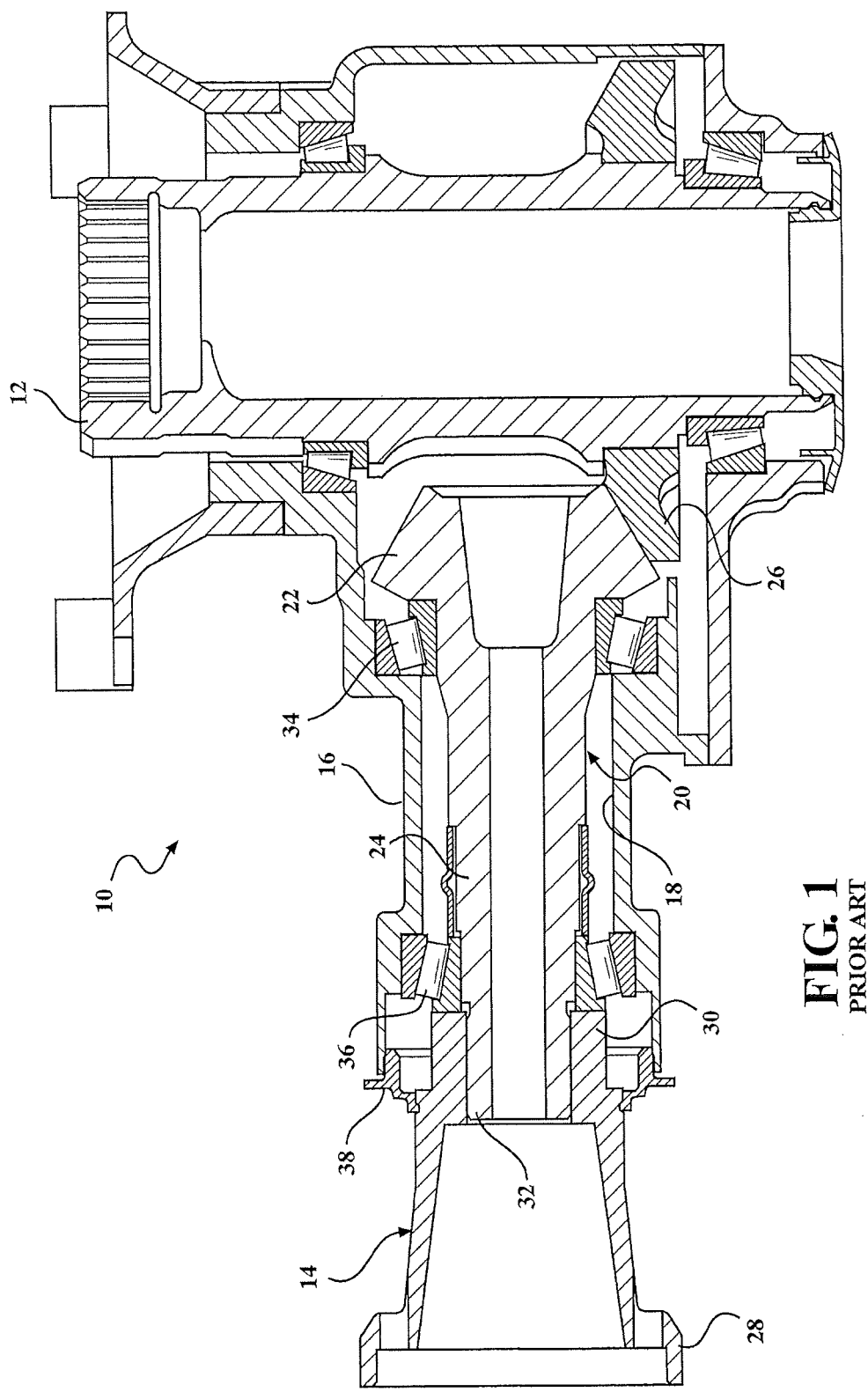
FIG. 1 is a cross-sectional view of a gearbox according to the prior art.
Figure 2:
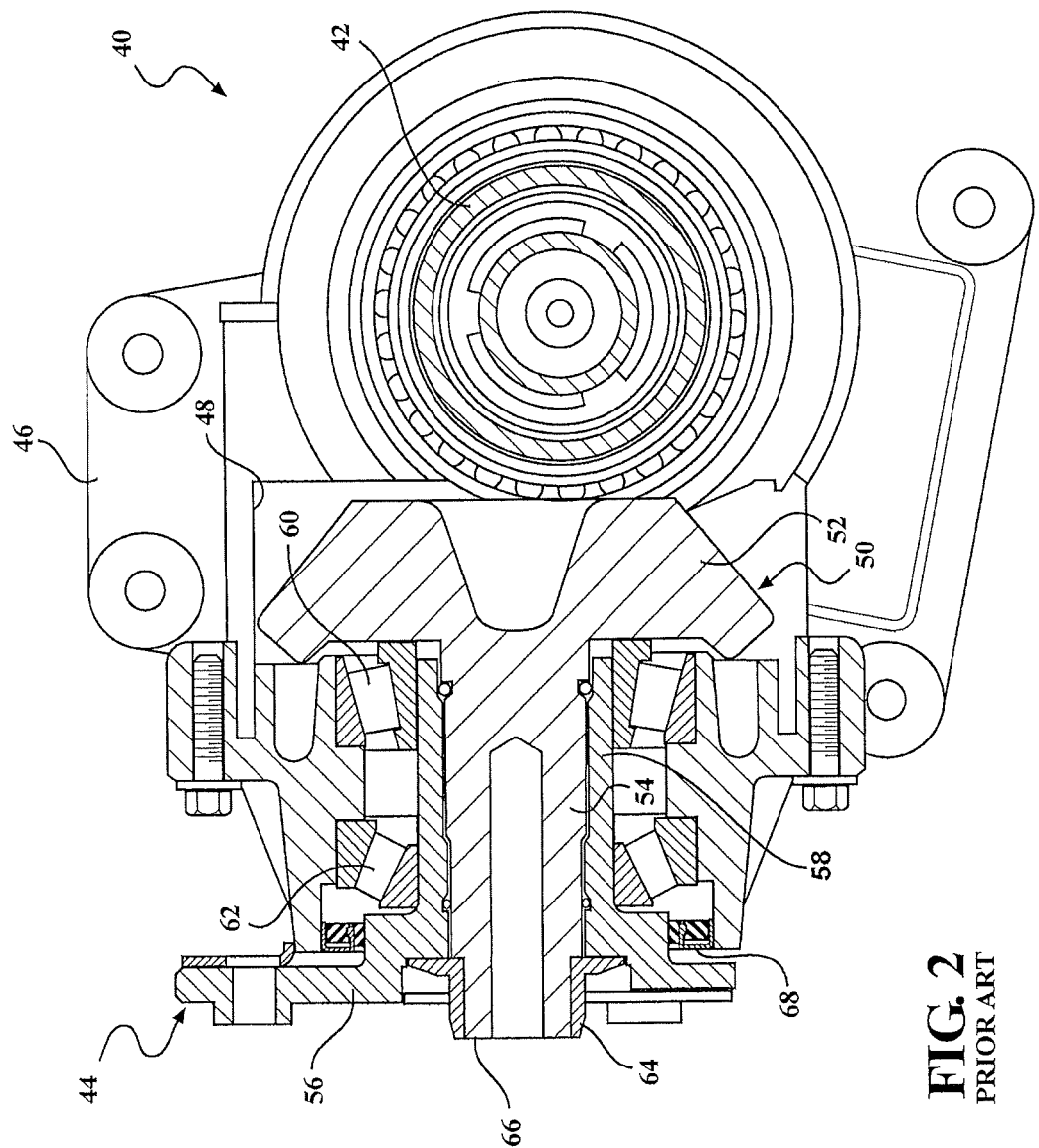
FIG. 2 is a cross-sectional view of a axially compact gearbox according to the prior art.
Figure 3:
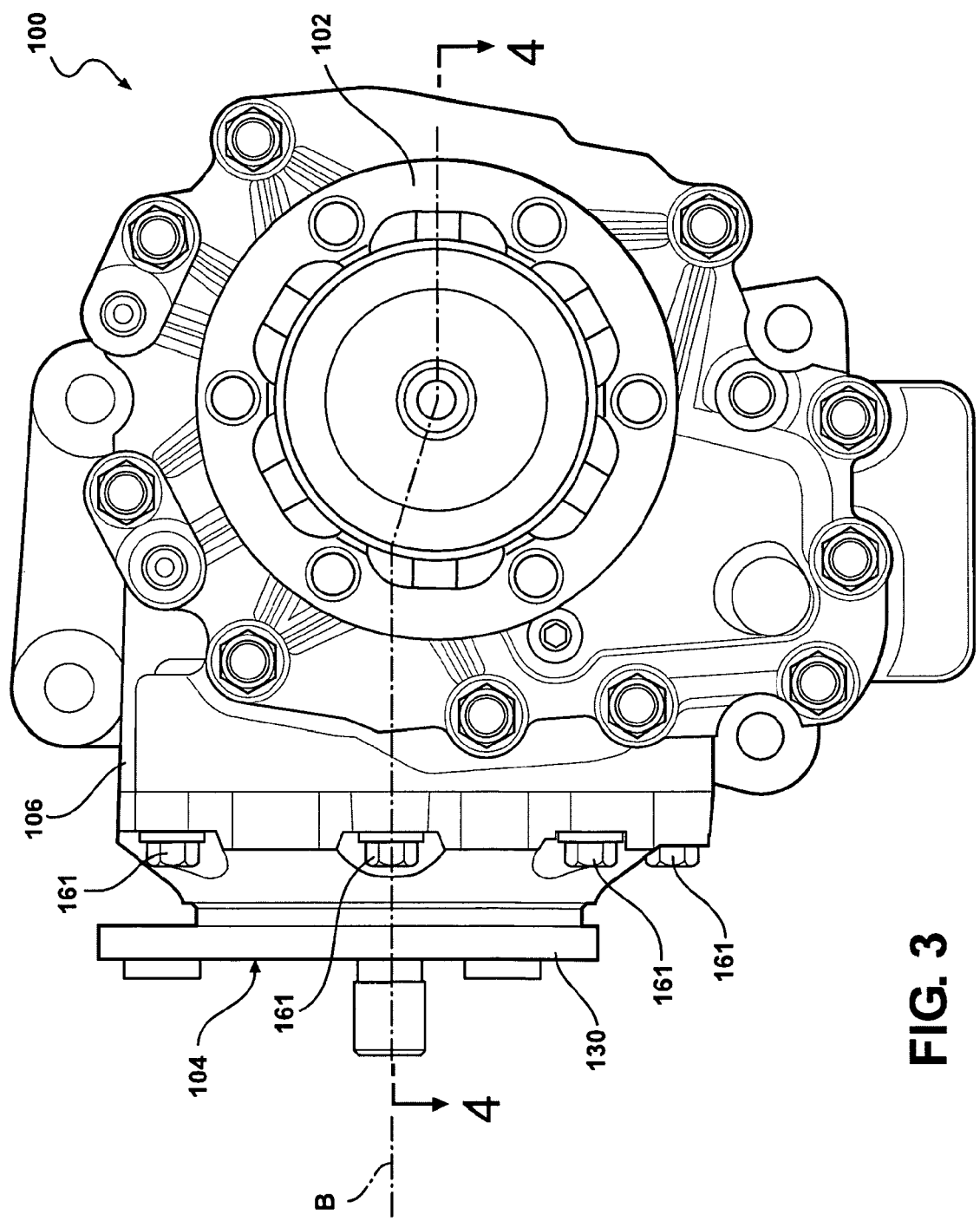
FIG. 3 is an end view of a gearbox according to one embodiment of the invention.
Figure 4:
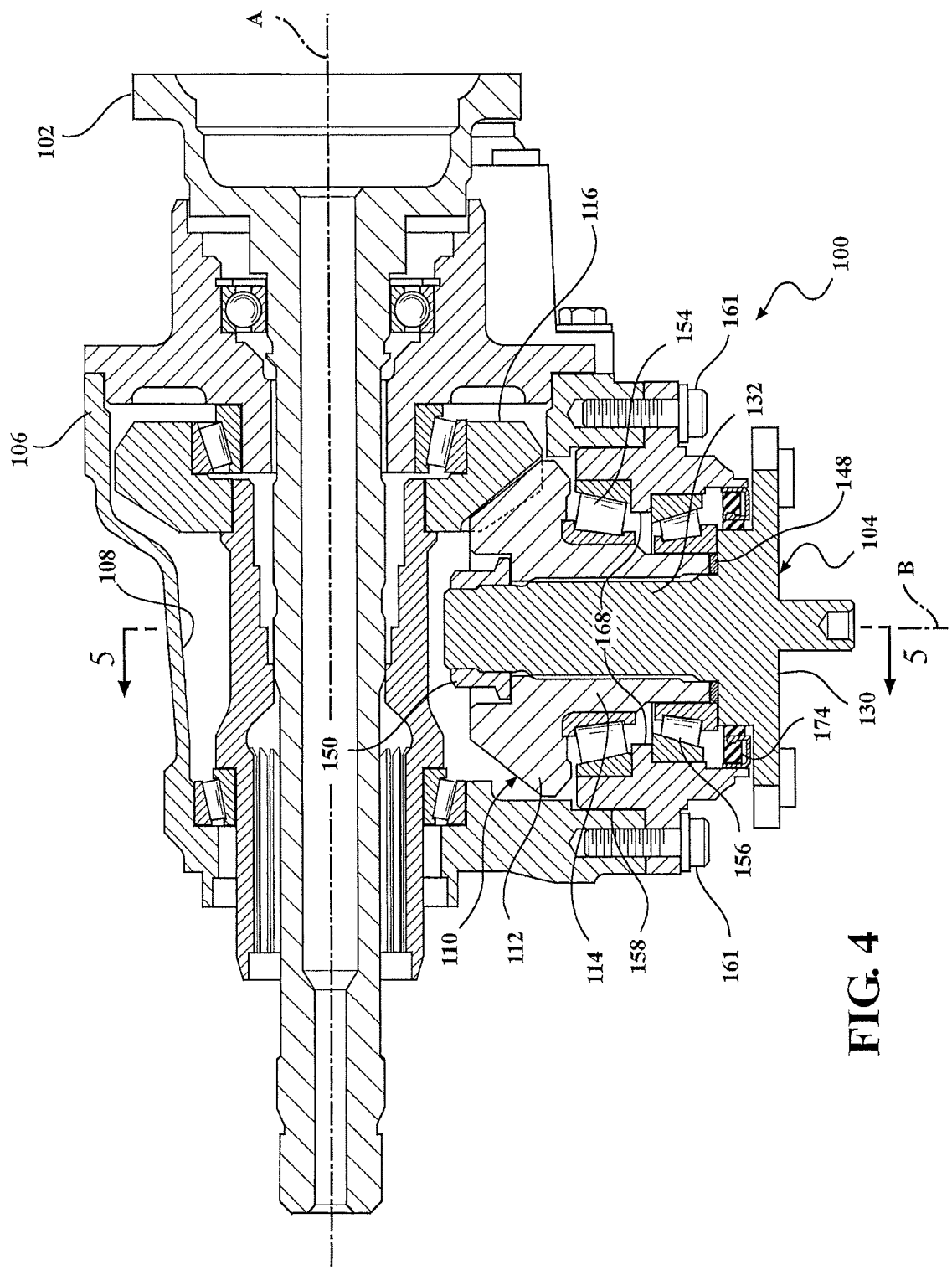
FIG. 4 is a side view of a cross-section taken along lines 4-4 in FIG. 3.
Figure 5:
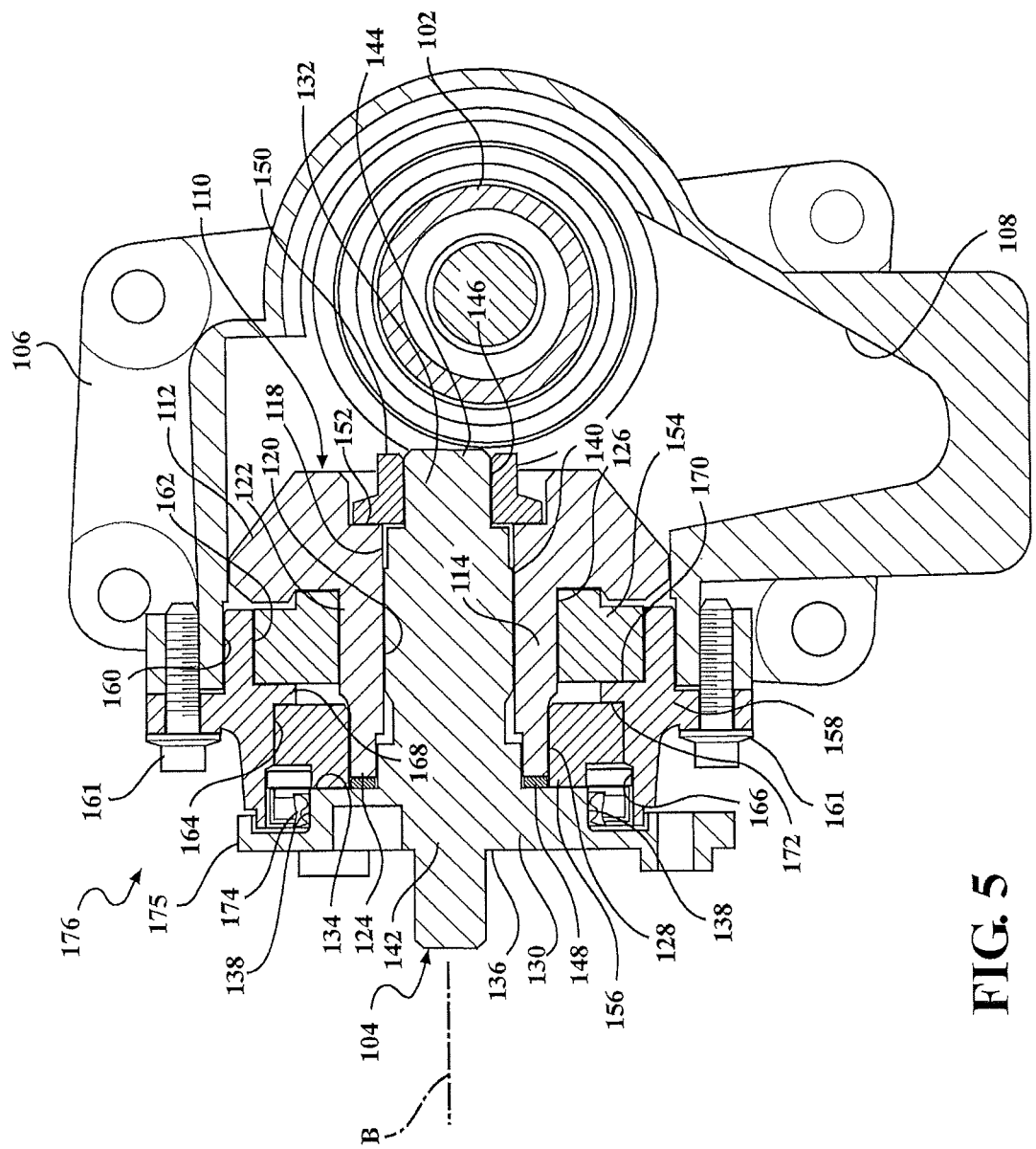
FIG. 5 is a cross-sectional view taken along lines 5-5 in FIG. 4.
Figure 6:
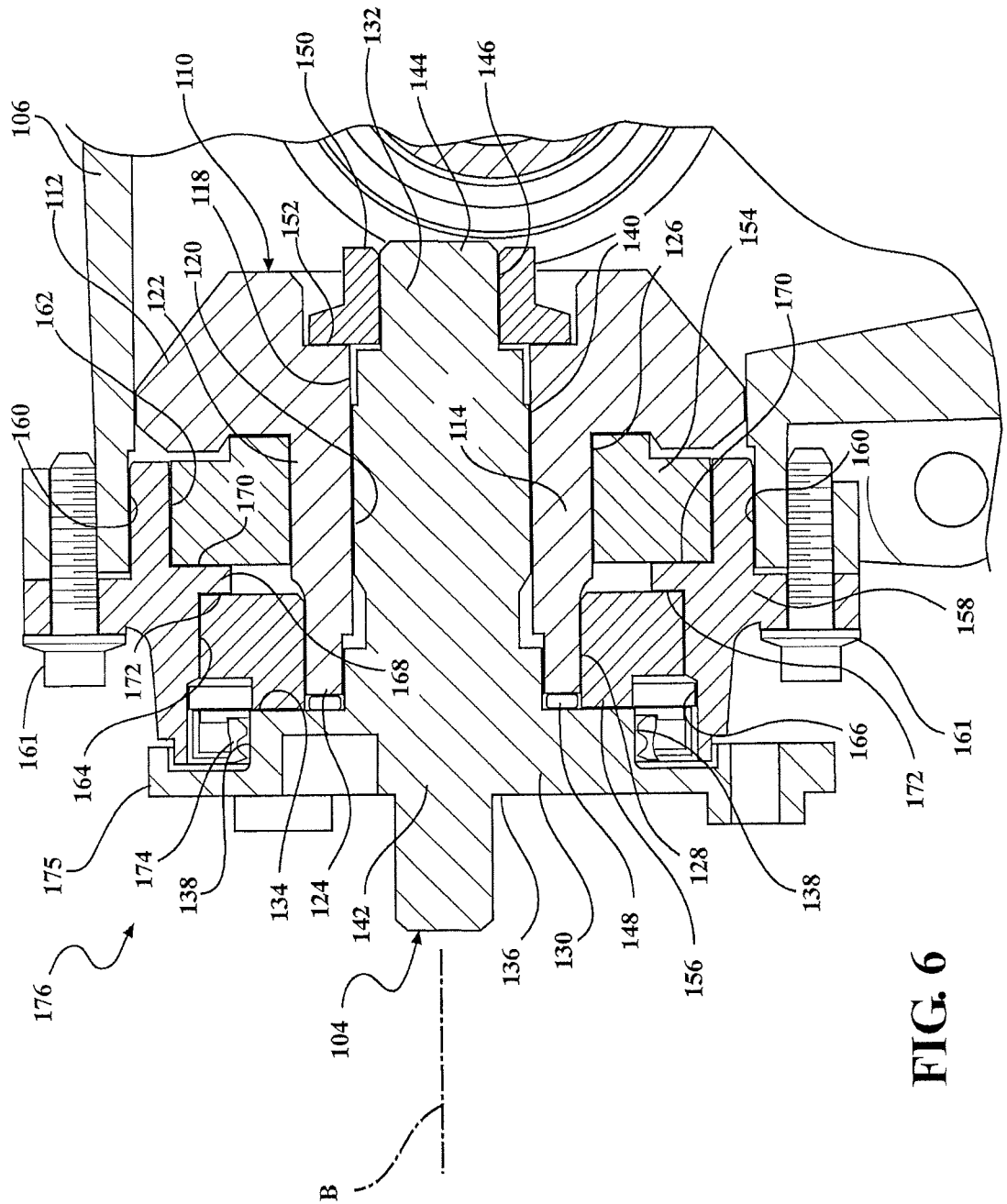
FIG. 6 is a fragmentary, enlarged view of FIG. 5.

Before describing an embodiment of the present invention, a pair of prior art gearbox assemblies are discussed, for clarity, with reference to FIGS. 1 and 2. Referring to FIG. 1, a gearbox is generally shown at 10 for transmitting power in the form of rotational movement from an input shaft 12 to an output member 14. The gearbox 10 includes a housing 16 defining an internal cavity 18 for containing the input shaft 12 and a pinion gear 20. The pinion gear 20 extends generally perpendicular to the input shaft 12 and includes a gear portion 22 and an elongated gear stem 24. A ring gear 26 is coupled to the input shaft 12 for rotation therewith. The ring gear 26 is oriented for meshing engagement with the gear portion 22 of the pinion gear 20 to transmit rotation of the input shaft 12 to rotation of the pinion gear 20. The output member 14 includes an output flange 28 and a tubular output stem 30 that is internally splined. An end portion 32 of the gear stem 24 is externally splined to engage with the internally splined output stem 30 to transmit rotation of the pinion gear 20 to rotation of the output member 14. The pinion gear 20 is rotatably supported along its length by first and second bearings 34, 36 disposed radially between the gear stem 24 and the housing 16. A clamping nut (not shown) is threaded to the end portion 32 of the gear stem 24 to retain the output member 14 and the pinion gear 20 together. A seal 38 is disposed between the output member 14 and the housing 16 to prevent gearbox lubricant from leaking therefrom. The pinion gear 20 and the output member 14 define an axial length of the gearbox 10.

Referring to FIG. 2, an axially compact gearbox is generally shown at 40 for transmitting power in the form of rotational movement from an input shaft 42 to an output member 44. The gearbox 40 includes a housing 46 defining an internal cavity 48 for containing the input shaft 42 and a pinion gear 50. The pinion gear 50 extends generally perpendicular to the input shaft 42 and includes a gear portion 52 and a gear stem 54 that is relatively shorter than the elongated gear stem 24 in FIG. 1. A ring gear (not shown) is coupled to the input shaft 42 for rotation therewith. The ring gear is oriented for meshing engagement with the gear portion 52 of the pinion gear 50 to transmit rotation of the input shaft 42 to rotation of the pinion gear 50. The output member 44 includes an output flange 56 and a tubular output stem 58 that is internally splined. The gear stem 54 is externally splined along its length to engage with the internally splined output stem 58 to transmit rotation of the pinion gear 50 to rotation of the output member 44. More specifically, the output stem 58 overlaps and engages with the gear stem 54. Thus, the output member 44 and in turn the pinion gear 50 are rotatably supported by first and second bearings 60, 62 disposed radially between the output stem 58 and the housing 46. A clamping nut 64 is threaded to an end portion 66 of the gear stem 54 to retain the output member 44 and the pinion gear 50 together. A seal 68 is disposed between the output flange 56 and the housing 46 to prevent gearbox lubricant from leaking therefrom. The pinion gear 50, output member 44 and clamping nut 64 define an axial length of the gearbox 40.

A first embodiment of the present invention will now be described with reference to FIGS. 3 through 6. A gearbox is generally shown at 100 for transmitting power in the form of rotational movement from a driving member or input shaft 102 to an output member 104. The gearbox 100 includes a housing 106 defining an internal cavity 108 for containing the input shaft 102 and a pinion gear 110. The input shaft 102 extends in a longitudinal direction and defines a first axis A. The pinion gear 110 is formed to include a gear portion 112 and a tubular gear stem 114 that extends in an axial direction generally perpendicular to the input shaft 102 and defines a second axis B.

A ring gear 116 is coupled to the input shaft 102 for rotation therewith. The ring gear 116 is oriented for meshing engagement with the gear portion 112 of the pinion gear 110. It is appreciated that the pinion gear 110 may be any of a variety of pinion gear types such as a hypoid pinion gear, a bevel pinion gear, or a spiral bevel pinion gear without varying from the scope of the invention. The pinion gear 110 defines an axial bore 118 that extends therethrough and is coaxial with the second axis B when the pinion gear 110 is assembled into the gearbox 100. The axial bore 118 of the gear stem 114 includes an internally splined surface 120 for engagement with the output member 104, as is described in detail below. The gear stem 114 extends between a proximal end 122 adjacent the gear portion 112 and an opposite distal end 124. In the embodiment shown, the gear stem 114 includes a first circumferential surface 126 at the proximal end 122 thereof and a second circumferential surface 128 at the distal end 124 thereof. The diameter of the first circumferential surface 126 is larger than the diameter of the second circumferential surface 128. The pinion gear 110 is contained entirely within the housing 106.

The output member 104 is formed to include a disc-shaped output flange 130 and a solid output stem 132 that extends in the axial direction and is coaxial with the second axis B when the output member 104 is assembled into the gearbox 100. The output flange 130 includes an inner side 134 and an outer side 136. The inner side 134 is formed to include a first circumferential sealing surface 138 that is coaxial with the second axis B. The outer side 136 is adapted for engagement with a driven member (not shown). The output stem 132 includes an externally splined surface 140 for engagement with the internally splined surface 120 of the gear stem 114 when inserted therein. The output stem 132 extends between a proximal end 142 adjacent the inner side 134 of the output flange 130 and an opposite distal end 144. The distal end 144 of the output stem 132 includes a threaded portion 146. When the gearbox 100 is assembled, the output stem 132 extends through the axial bore 118 of the pinion gear 110 such that the externally splined surface 140 engages with the internally splined surface 120. The distal end 124 of the gear stem 114 is adjacent the proximal end 142 of the output stem 132 and the inner side 134 of the output flange 130. The distal end 144 of the output stem 132 is adjacent the gear portion 112 of the pinion gear 110. A spacer 148 extends circumferentially around the output stem 132 and is disposed between the inner side 134 of the output flange 130 and the distal end 124 of the gear stem 114. A clamping nut 150 is threadably engaged with the threaded portion 146 of the output stem 132 to secure the output member 104 and pinion gear 110 together. The thrust face of the clamping nut 150 engages a recessed surface 152 in the gear portion 112 of the pinion gear 110.

The pinion gear 110, and in turn the output member 104, are rotatably supported within the housing 106 by first and second bearings 154, 156. A bearing support 158 is fixedly secured to an opening 160 in the housing 106 by any suitable means for attachment, such as a plurality of screws or bolts 161. The bearing support 158 includes a first circumferential bearing surface 162, a second circumferential bearing surface 164, and a second circumferential sealing surface 166. The first and second bearing surfaces 162, 164 are separated by a circumferential wall 168 therebetween. The second sealing surface 166 is disposed adjacent the second bearing surface 164. The first and second bearing surfaces 162, 164 and the second sealing surface 166 are coaxial with the second axis B. In the embodiment shown, the diameter of the first bearing surface 162 is larger than the diameter of the second sealing surface 166 and the diameter of the second bearing surface 164 is smaller than the diameter of the second sealing surface 166.

When the gearbox 100 is assembled, the first and second bearing surfaces 162, 164 are radially spaced apart from and face the first and second circumferential surfaces 126, 128 of the gear stem 114, respectively. In addition, the second sealing surface 166 of the bearing support 158 is spaced apart from and faces the first sealing surface 138 of the output member 104. The first bearing 154 is disposed radially between and directly engages the first circumferential surface 126 of the gear stem 114 and the first bearing surface 162 of the bearing support 158. The first bearing 154 is disposed axially between the gear portion 112 of the pinion gear 110 and a first side 170 of the wall 168 of the bearing support 158. The second bearing 156 is disposed radially between and directly engages the second circumferential surface 128 of the gear stem 114 and the second bearing surface 164 of the bearing support 158. The second bearing 156 is disposed axially between the inner side 134 of the output flange 130 and a second side 172 of the wall 168 of the bearing support 158. A primary seal 174 is disposed between the first sealing surface 138 of the output member 104 and the second sealing surface 166 of the bearing support 158. The output flange 130 includes a debris deflector 175 that encloses the primary seal 174 between the output flange 130 and the bearing support 158 to protect the primary seal 174. The primary seal 174 prevents gearbox lubricant from leaking out of the housing 106 through the opening 160.

The pinion gear 110 and output member 104 are pre-assembled separately from the gearbox 100 and are mounted to the gearbox assembly 100 as part of a pinion gear assembly 176. The pinion gear assembly 176 includes the pinion gear 110, output member 104, first and second bearings 154, 156, spacer 148, bearing support 158 and primary seal 174. To assemble the pinion gear assembly 176, the first and second bearings 154, 156 are pressed into the respective first and second bearing surfaces 162, 164 of the bearing support 158. The gear stem 114 is then inserted through the axial bore of the first bearing 154 and the axial bore of the second bearing 156 such that the axial bore of the first bearing 154 is seated on the first circumferential surface 126 of the gear stem 114 and the axial bore of the second bearing 156 is seated on the second circumferential surface 128 of the gear stem 114. Next, the pinion gear 110 and first and second bearings 154, 156 are subjected to a target axial load to compress the first and second bearings 154, 156 and remove any other compliances in the stack-up. While the pinion gear 110 and first and second bearings 154, 156 are being subjected to the target axial load a measurement is taken from an outer edge of the second bearing 156 to the distal end 124 of the gear stem 114. This measurement defines the thickness of the spacer 148. The spacer 148, with the predetermined thickness, is installed around the output stem 132 next to the inner side 134 of the output flange 130 and the primary seal 174 is seated around the first sealing surface 138 of the output flange 130. The output stem 132 is then inserted through the axial bore 118 of the pinion gear 110 to engage the externally splined surface 140 of the output stem 132 with the internally splined surface 120 of the gear stem 114. The output stem 132 is inserted until the primary seal 174 is seated on the second sealing surface 166 of the bearing support 158. The clamping nut 150 is threaded onto the threaded portion 146 of the output stem 132 and tightened to return the pinion gear assembly 176 to the geometry that it had under the target axial load. Thus, the preload of the first and second bearings 154, 156 will match the target axial load that was applied during setup. Finally, the pinion gear 110 is inserted into the opening 160 in the housing 106 and the bearing support 158 is coupled to the housing 106 with the plurality of bolts 161.

The gearbox 100 described above includes many advantages over the prior art, several of which are disclosed herein without limitation. First, the clamping nut 150 does not add to the axial length of the gearbox 100 because the clamping nut 150 is disposed inside, rather than outside the housing 106. Second, because the clamping nut 150 is disposed inside the housing 106, the leak path identified in the prior art at the interface between the clamping nut, the gear stem and the output flange is eliminated. Third, the relatively large diameter of the tubular gear stem 114 has greater stiffness than the solid gear stems 24, 54 disclosed in the prior art. Fourth, the tubular gear stem 114 reduces the amount of expensive gear steel, which is replaced with less expensive material used for the output member 104. Fifth, the thrust face of the clamping nut 150 is seated against the recessed surface 152 of the pinion gear 110, which is made from a hardened gear steel, rather than against the output member 104, which is not hardened or must be hardened for this purpose, as disclosed in the prior art. Sixth, if required, the clamping nut 150 is staked to the output stem 132 rather than the hardened gear steel of the gear stem 114, as disclosed in the prior art. Thus, if disassembly of the pinion gear assembly 176 is required and the pinion gear 110 is to be re-used, there is no potential for residual damage to pinion gear 110 from the previous staking operation because the clamping nut 150 is not staked to the gear stem 114. Seventh, the clamping nut 150 is threaded onto the output stem 132 rather than the gear stem 114, thereby eliminating the requirement that a threaded portion at an end of the gear stem 114 be annealed to prevent fracture, as disclosed in the prior art. Eighth, the axial bore of the first bearing 154, which is adjacent the heavily loaded gear portion 112 of the pinion gear 110, is larger than the axial bore of the second bearing 156. In contrast, the more heavily loaded first bearing 60 in the axially compact gearbox 40 disclosed in FIG. 2 must have an axial bore that is the same as or smaller than an axial bore of the second bearing 62 to allow assembly thereof.

Referring to FIG. 7, wherein like primed reference numerals represent similar elements as those described above, in a second embodiment of a gearbox 100' a distal end 124' of a gear stem 114' includes an externally threaded portion 178. As in the first embodiment, a pinion gear 110' defines an axial bore 118' that extends therethrough and is coaxial with a second axis B' when the pinion gear 110' is assembled into the gearbox 100'. An output member (not shown) extends into the axial bore 118' of the pinion gear 110' for splined engagement therewith. A proximal end 122' of the gear stem 114' adjacent a gear portion 112' is closed with a spring plug 180. The spring plug 180 seals the proximal end 122' of the gear stem 114' to prevent gearbox lubricant from leaking through the pinion gear 110' and out of a housing 106'. It is contemplated that the spring plug 180 may be a wall of material that is integrally formed as part of the pinion gear 110'. The pinion gear 110', and in turn the output member, are rotatably supported within the housing 106' by first and second bearings 154', 156'. More specifically, the first and second bearings 154', 156' are radially disposed between the gear stem 114' of the pinion gear 110' and a bearing support 158' that is fixedly secured to the housing 106'.

A clamping nut 182 is threadably coupled to the externally threaded portion 178 of the gear stem 114' for retaining the first and second bearings 154', 156', the pinion gear 110', and the bearing support 158' together. A spacer 184 extends circumferentially around the gear stem 114' and is disposed between an inner side 186 of the clamping nut 182 and an outer side 188 of the second bearing 156'. The inner side 186 of the clamping nut 182 is formed to include a first circumferential sealing surface 138'. A primary seal 174' is disposed between the first sealing surface 138' of the clamping nut 182 and a second sealing surface 166' of the bearing support 158'. The clamping nut 182 also includes a debris deflector 175' that encloses the primary seal 174' between the clamping nut 182 and the bearing support 158' to protect the primary seal 174'.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A gearbox for transmitting rotational movement from a driving member to a driven member, said gearbox comprising:
    a housing;
    a pinion gear disposed inside said housing, said pinion gear including a gear portion and a tubular gear stem, said pinion gear adapted for engagement with the driving member and defining an axial bore extending therethrough, said pinion gear rotating in response to rotation of the driving member;
    an output member extending through said axial bore of said pinion gear and engaging therewith, said output member including an output flange disposed outside the housing that is adapted for engagement with the driven member, said output member rotating in response to rotation of said pinion gear;
    a clamping nut threadably coupled to said output member and abutting said pinion gear retaining said output member and said pinion gear together;
    first and second bearings, the first bearing disposed radially between said pinion gear and said housing, each of the first and second bearings rotatably supporting said pinion gear and said output member; and
    a bearing support extending through an opening in said housing, said bearing support fixed to said housing and including first and second circumferential bearing surfaces and an inwardly protruding wall portion disposed between the first circumferential bearing surface and the second circumferential bearing surface, wherein
    the first bearing is disposed radially between said tubular gear stem and the first circumferential bearing surface and is in contact with the gear portion of the pinion gear and a first side of the bearing support wall portion, and
    the second bearing is disposed radially between said tubular gear stem and the second circumferential bearing surface and is in contact with the output flange and a second side of the bearing support wall portion.

2. A gearbox as set forth in claim 1 wherein said output member includes an output stem including a distal threaded end, said output stem extending through said axial bore of said pinion gear and said clamping nut threadably coupled to said distal threaded end of said output member and abutting said pinion gear.

3. A gearbox as set forth in claim 2 wherein said gear portion of said pinion gear includes a recessed surface and said clamping nut engages said recessed surface in said gear portion.

4. A gearbox as set forth in claim 3 wherein said first circumferential surface of said tubular gear stem having a first diameter is disposed adjacent said gear portion and said second circumferential surface of said tubular gear stem having a second diameter smaller than said first diameter is disposed adjacent said first circumferential surface of said tubular gear stem.

5. A gearbox as set forth in claim 4 wherein said first bearing is preloaded between said gear portion of said pinion gear and said wall portion of said bearing support and said second bearing is preloaded between said output flange of said output member and said wall portion of said bearing support in response to tightening said clamping nut against said recessed surface of said pinion gear.

6. A gearbox as set forth in claim 5 including a seal, wherein said output flange includes a first circumferential sealing surface and said bearing support includes a second circumferential sealing surface radially offset from said first circumferential sealing surface, said seal disposed radially between said first and second circumferential sealing surfaces.

7. A gearbox as set forth in claim 6 wherein said tubular gear stem of said pinion gear includes an internally splined surface and said output stem of said output member includes an externally splined surface for splined engagement with said internally splined surface of said tubular gear stem.

8. A gearbox as set forth in claim 7 including a spacer extending circumferentially around said output stem, said spacer disposed between said output flange and said tubular gear stem.

9. A gearbox as set forth in claim 8 wherein said output flange includes a debris deflector enclosing said seal between said output flange and said bearing support.

10. A gearbox as set forth in claim 9 wherein said pinion gear and said output member rotate about an axis in response to rotation of the driving member.

11. A gearbox as set forth in claim 10 wherein said first and second circumferential surfaces of said tubular gear stem and said first circumferential sealing surface of said output flange are coaxial with said axis, and said first and second circumferential bearing surfaces and said second circumferential sealing surface of said bearing support are coaxial with said axis, said first and second circumferential bearing surfaces of said bearing support spaced radially apart from said first and second circumferential surfaces of said tubular gear stem, and said second circumferential sealing surface of said bearing support spaced radially apart from said first circumferential sealing surface of said output flange.

12. A gearbox comprising:
a housing defining an internal cavity;
an opening in the housing that communicates with the internal cavity;
an input shaft disposed in said internal cavity and extending along a first axis, said input shaft including a ring gear rotatable with said input shaft about said first axis; and
a gear subassembly that is configured to be preassembled prior to assembly with the housing so as to permit insertion and removal of the gear subassembly from the housing as a single unit, the gear subassembly disposed in the opening and engaged with the ring gear, the gear subassembly comprising:
a pinion gear, disposed in said internal cavity and extending along a second axis generally perpendicular to said first axis, said pinion gear including a gear portion meshingly engaged with said ring gear and a tubular gear stem extending axially from said gear portion along said second axis, said pinion gear rotating about said second axis in response to rotation of said input shaft about said first axis;
an output member including an output flange disposed outside said housing and an output stem extending axially from said output flange along said second axis through said tubular gear stem, said output stem engaging with said tubular gear stem thereby rotating said output member about said second axis in response to rotation of said pinion gear about said second axis;
a clamping nut threadably coupled to said output stem and abutting said gear portion of said pinion gear retaining said output member and said pinion gear together;
first and second bearings disposed radially between said tubular gear stem and said housing, said first and second bearings rotatably supporting said pinion gear and said output member; and
a bearing support member disposed between the housing and the first and second bearings, the bearing support member configured to connect the gear subassembly to the housing, and retain the first and second bearings against the tubular gear stem independently of the housing.

13. A gearbox as set forth in claim 12 wherein said output stem extends from said output flange to a distal end having a threaded portion, said distal end adjacent said gear portion of said pinion gear.

14. A gearbox as set forth in claim 13 wherein said clamping nut is threadably coupled to said threaded portion at said distal end of said output stem.

* * * * *